(12) United States Patent
Tomono et al.

(10) Patent No.: US 6,790,873 B2
(45) Date of Patent: Sep. 14, 2004

(54) OCULAR LENS AND PROCESS FOR ITS PRODUCTION

(75) Inventors: Yoshihiro Tomono, Kasugai (JP); Kazuhiko Nakada, Kasugai (JP)

(73) Assignee: Menicon Co., Ltd., Nagoya (JP)

(*) Notice: Subject to any disclaimer, the term of this patent is extended or adjusted under 35 U.S.C. 154(b) by 204 days.

(21) Appl. No.: 10/178,017

(22) Filed: Jun. 24, 2002

(65) Prior Publication Data

US 2003/0127758 A1 Jul. 10, 2003

(30) Foreign Application Priority Data

Jun. 25, 2001 (JP) ........................................ 2001-191303

(51) Int. Cl.⁷ .......................... B29C 7/00; B29C 35/08; B29C 37/00; B29D 11/00; G02B 1/04
(52) U.S. Cl. ........................ 522/2; 522/168; 522/173; 522/174; 522/175; 522/176; 522/178; 522/179; 522/182; 522/184; 522/185; 351/160 H
(58) Field of Search ........................... 522/2, 168, 173, 522/174, 175, 176, 179, 182, 184, 185; 351/160 H

(56) References Cited

U.S. PATENT DOCUMENTS

| | | |
|---|---|---|
| 5,049,321 A | 9/1991 | Galic |
| 5,702,825 A * | 12/1997 | Keita et al. ................ 428/500 |
| 5,805,264 A | 9/1998 | Janssen et al. |

FOREIGN PATENT DOCUMENTS

| | | |
|---|---|---|
| EP | 0 362 137 | 4/1990 |
| EP | 0 384 632 | 8/1990 |
| EP | 0 472 303 | 2/1992 |
| JP | 57-34518 | 2/1982 |
| JP | 02-124523 | 5/1990 |
| JP | 06-49251 | 2/1994 |
| WO | WO 00/04078 | 1/2000 |

\* cited by examiner

*Primary Examiner*—Nathan M. Nutter
(74) *Attorney, Agent, or Firm*—Oblon, Spivak, McClelland, Maier & Neustadt, P.C.

(57) ABSTRACT

An ocular lens having a desired shape without having a deformation induced by its process, and having a uniform coat layer on its surface, is proceeded by single mold polymerization. The ocular lens is produced by a process comprising a step of irradiating at least one part of the molding surface for the ocular lens of the mold with an excimer light, a step of coating a compound fixable to the ocular lens surface by an interaction with a polymerizable component in the ocular lens material, or its solution on the mold surface after irradiating with an excimer light, a step of filling the ocular lens material into the mold after coating, and polymerizing, a step of releasing a polymer obtained by the polymerization from the mold, and obtaining an ocular lens stock material having above-mentioned component fixed on its surface, and a step extracting unfixed unreacted components from obtained ocular lens stock material.

13 Claims, 2 Drawing Sheets

OCULAR LENS AND PROCESS FOR ITS PRODUCTION

The present invention relates to an ocular lens and a process for its production, particularly to an ocular lens having a surface layer constituted by a component different from a polymerizable component of the main body of the ocular lens, and a process for its production.

As a method to correct a sight, lenses are widely used. As ocular lenses, there are not only those that are put on the eyeballs such as contact lenses, but also so called intraocular lenses, which are inserted in the eyeballs of cataract patients after extracting crystalline lenses.

Heretofore, these ocular lenses used to be produced by a cutting process. However, because of a problem in productivity, the process has been changed to a mold-polymerization using a mold. In the process of mold-polymerization, the mold is constituted by a combination of a male mold and a female mold, and a lens material is filled and polymerized in a space formed between them to obtain an ocular lens stock material. The obtained ocular lens stock material is released from the mold and subjected to a treatment such as removing unreacted residual components, to obtain an ocular lens.

In recent years, as a cause of ocular disease of ocular lens wearers, attention has been drawn to lowering of the hydrophilic property (the tear wettability), or adhesion of contaminants such as proteins or fats on the surface of the ocular lens. Therefore, in order to prevent ocular disease, improvements of an ocular lens with regard to the hydrophilic property of the ocular lens surface and preventing the adhesion of contaminants on its surface, have been sought.

For example, JP-A-57-34518 discloses a method for improving the water wettability by subjecting the surface of an ocular lens stock material to plasma treatment to modify it. Further, JP-A-6-49251 discloses a method of grafting a hydrophilic monomer to the surface of an ocular lens stock material, also to modify the surface of the ocular lens.

However, by these methods, the surface of the ocular lens stock material once formed is subjected to the physical-chemical treatment, whereby deformation is induced to the ocular lens stock material, and consequently the necessary shape can not be obtained when the ocular lens is completed.

On the other hand, PCT International Publication WO00/04078 discloses a process which comprises coating the mold surface with a solution of a polymer having dipolar ion groups excellent in biocompatibility, and producing a lens polymer by using the coated mold, to obtain an ocular lens stock material having a polymer coating layer on its surface. This process can form the entire ocular lens stock material including the coating layer on the surface by a single step of polymerization, whereby as compared with the above-mentioned process of subjecting the lens stock material after polymerization to a treatment, it is considered to be superior in that deformation of the lens stock material can be avoided.

However, this method has a problem that when the mold is coated with the polymer solution, the solution tends to pool along the shape of the mold, whereby the coating layer will be formed nonuniformly. Usually, the coating layer is constituted by a material different from the polymerizable component of the ocular lens, and accordingly nonuniform formation of the coating layer tends to lead to deformation of the ocular lens material or cloudiness when it is polymerized, and potentially jeopardizes optical functions of the ocular lens.

Accordingly, an object of the present invention is to provide an ocular lens without accompanying deformation induced in the process, and having a uniform coating layer on its surface. Another object is to produce an ocular lens stock material having a uniform coating layer on its surface by a single step of mold-polymerization.

The ocular lens of the present invention is produced by a process comprising a step of irradiating with an excimer light at least a part of molding surface of the mold for shaping an ocular lens surface, a step of uniformly coating the mold surface irradiated with the excimer light, with a compound or a solution of such compound which will form a coating layer, a step of filling an ocular lens material into the mold and polymerizing it, a step of releasing a polymer obtained by the polymerization from the mold, to obtain an ocular lens stock material having the above-mentioned compound fixed on its surface, and a step of extracting an unfixed and unreacted compound from the obtained ocular lens stock material.

The compound to form a coating layer is a compound fixable to the surface of the ocular lens by an interaction with a polymerizable component in the ocular lens material.

Figure 1A:
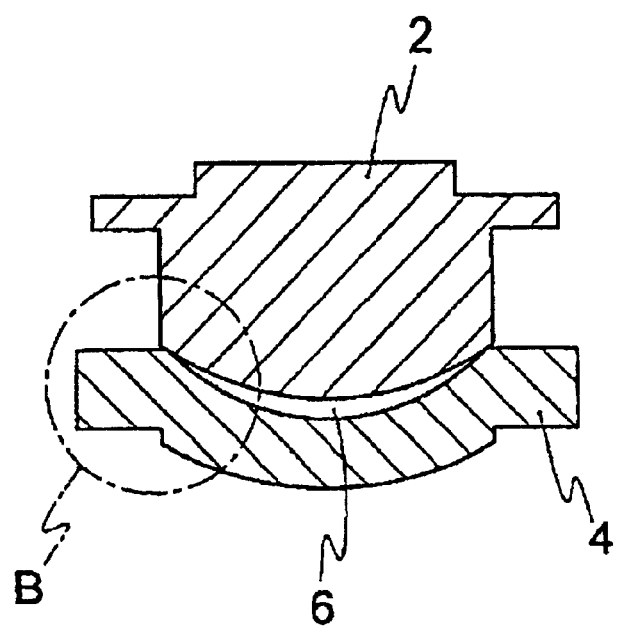
FIG. 1(a) is a view showing a mold to be used to produce an ocular lens, and an ocular lens stock material formed in the mold.

In the drawings, reference numeral 2 indicates a male mold, reference numeral 4 a female mold, reference numeral 6 an ocular lens (main body of ocular lens) and reference numeral 8 a coating layer (coating layer of ocular lens).

Now, the process of the ocular lens of the present invention will be described with reference to FIGS. 1(a) to 1(c).

Figure 1B:
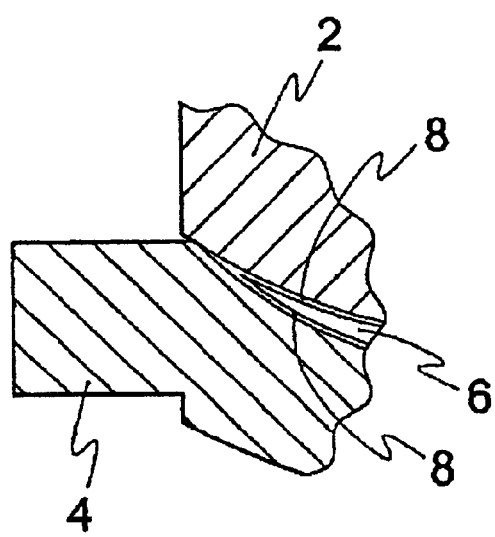
FIG. 1(b) is an enlarged view of portion B of FIG. 1(a).
Figure 1C:
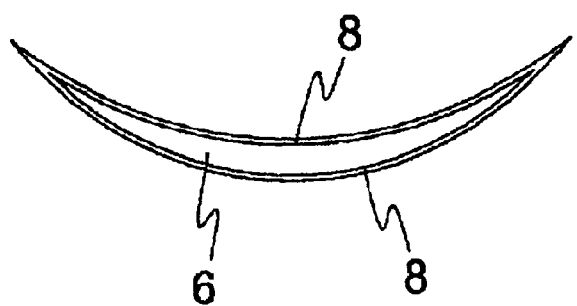
FIG. 1(c) is a view showing the ocular lens stock material after released from the mold.

FIG. 1(a) is a cross-sectional view showing the mold to be used to produce the ocular lens and the ocular lens stock material formed in the mold, FIG. 1(b) is an enlarged view of its portion B, and FIG. 1(c) is a view showing the ocular lens stock material released from the mold.

Step 1

In the process for producing an ocular lens according to the present invention, first of all, the molding surface of the mold used to form a lens surface, particularly, the bottom surface (convex surface) of a male mold 2 and/or the top surface (concave surface) of a female mold 4 are irradiated with an excimer light.

The mold is usually a resin mold, for example, made of a polyolefin such as polypropylene or polyethylene, or a synthetic resin such as polystyrene, polycarbonate, polymethyl methacrylate, an ethylene-vinyl alcohol copolymer, polyacetal, polyamide, polyester or polysulfone.

As for the type of excimer light, it may be the one using an emission gas such as argon (center wavelength of the emission spectrum: 126 nm), krypton (same: 146 nm), xenon (same: 172 nm), krypton chloride (same: 222 nm) or xenon chloride (same: 308 nm). It is preferred to use a vacuum ultraviolet light having an emission center wavelength of 172 nm by using xenon as an emission gas. The irradiation time with the excimer light may be from 1 second to 60 minutes, and preferably from 1 second to 10 minutes.

By the irradiation of the excimer light, active species (radicals) will be generated and physical etching will proceed on the surface of the mold.

In a step to be described later, the surface of the mold is coated with a material (hereinafter referred to also as a coating layer material) to form a coating layer of the ocular lens. However, depending on the combination of the mold material and the coating layer material for coating the mold, a repulsion interacting between these materials tends to be strong and makes it difficult to coat the mold with the coating layer material uniformly. Further, the mold is usually produced by injection molding. However, the smoothness of the surface of such a mold produced by the injection molding is not adequate. For this reason, the mold surface has a large surface energy, which hinders an affinity to a different type material (namely to the coating layer material) at the interface, which also makes it difficult to uniformly coat the mold with the coating layer material.

However, according to the present invention, the irradiation with the excimer light causes to generate active species (radicals) on the surface of the mold, and etches the surface of the mold to improve its smoothness. The active species (radicals) will function as a foothold for coating with the coating layer material, and the smooth surface has a small physical surface energy and is excellent in the affinity to the coating layer material. Thus, by modifying the surface of the mold by the irradiation with the excimer light, it becomes possible to form a good coating layer regardless of the type of the coating layer material.

A method is already known wherein a mold surface is irradiated with a plasma in an oxygen gas atmosphere or in an inert gas atmosphere to generate active species (radicals), which are used as a foothold for coating with a coating layer material.

However, if the mold is coated with the coating layer material after generating a large amount of radicals on its surface, a chemically strong interaction may occur at the interface of the mold and the coating layer material, depending on the combination of their materials. By this interaction, retrieving (or releasing) the ocular lens stock material from the mold tends to be difficult, thus leading to such problems that only the coating layer material will remain stuck on the surface of the mold, the coating layer material or the ocular lens main body material will be damaged, and a special technique or material will be required for the releasing from the mold.

Accordingly, it is preferred to control the generation of the active species appropriately, and to change the surface energy by physically etching the surface of the mold.

According to the present invention, by the irradiation with the excimer light, the generation of the active species (radicals) and the smoothening of the surface are performed simultaneously, whereby the amount of the active species (radicals) generated is small, as compared with the modification of the surface of a mold by conventional plasma irradiation. Accordingly, the interaction at the interface between the mold and the coating layer material can be suppressed, and the releasing from the mold will not become difficult.

Step 2

Then, as mentioned above, the surface of the mold irradiated with excimer light, is uniformly coated with the coating layer material.

The coating layer material is a compound fixable to the surface of the ocular lens by an interaction during the polymerization of the ocular lens material, or a solution of such a compound. Since the coating layer material is to be fixed to the surface of the ocular lens material, it is preferably a material copolymerizable with the polymerizable component in the ocular lens material. Moreover, in order to coat the surface of the mold uniformly, the coating layer material is preferably a monomer which is solid or a highly viscous liquid at room temperature, and it is preferably dissolved in a solvent and applied to the mold in the form of a solution, followed by drying to form a coating layer.

Such a monomer may, for example, be N-vinylacetamide; N-vinylformamide; N-vinyl-N-methylacetamide; N-isopropylacrylamide; 2-acrylamide-2-methylpropanesulfonic acid; an alkyl(meth)acrylamide such as N,N-dimethyl(meth)acrylamide, N,N-diethyl(meth)acrylamide or N,N-dipropyl(meth)acrylamide; a N-vinyl lactam such as N-vinyl-2-pyrrolidone, N-vinylpiperidone, N-vinylcaprolactam or N-vinylcaprylolactam; a hydroxyalkyl (meth)acrylate such as 2-hydroxyethyl (meth)acrylate, 2-hydroxypropyl (meth)acrylate or 2-hydroxybutyl (meth)acrylate; or (meth)acryl acid. It may preferably be N-vinylacetamide; N-vinylformamide; N-vinyl-N-methylacetamide; N-isopropylacrylamide; or a 2-acrylamide-2-methylpropanesulfonic acid, and more preferably, N-vinylacetamide is used, since it is easily stabilized (fixed) on the surface of the mold as the solvent is evaporated off.

Here, the solvent means an organic solvent having a low boiling point, i.e. a boiling point of from 15 to 150° C., preferably from 30 to 120° C. If the boiling point is lower than 15° C., the volatilization in the coating step is too rapid to achieve a uniform coating, and if it is higher than 150° C., the appropriate volatilization speed can not be obtained in the coating step at room temperature.

The solvent having a low boiling point may, for example, be an alcohol such as methanol, ethanol, propanol, butanol or pentanol; acetone; tetrahydrofuran; N,N-dimethylformamide; hexane; benzene; toluene; acetonitrile; or methylene chloride. These may be used alone or in combination as a mixture of two or more of them. Especially ethanol is suitably used, as it is excellent in safety and volatility and is inexpensive.

The coating material is not limited to a monomer having a relatively low molecular weight as described above, and a macromonomer or polymer which is solid or a highly viscous liquid at room temperature and is soluble in a solvent, may also be used.

A specific example of such a macromonomer may be a (meth)acrylate type polymer which comprises from 65 to 98.8 (mol %) of an alkyl (meth)acrylate type monomer, from 1 to 30 (mol %) of a hydrophilic group-containing monomer, and from 0.2 to 5 (mol %) of a monomer having two polymerizable groups in the molecule, and which has hydrophilic groups and at least one polymerizable group in the molecule, as disclosed as component (A) in JP-B-5-29091.

Here, the alkyl (meth)acrylate type monomer may be one wherein the alkyl group in the monomer is of a linear, branched or ring type, and hydrogen atoms in the alkyl group may be substituted by halogen atoms such as fluorine. Specifically, it may, for example, be an alkyl (meth)acrylate such as methyl (meth)acrylate, ethyl (meth)acrylate, propyl (meth)acrylate, butyl (meth)acrylate, pentyl (meth)acrylate, hexyl (meth)acrylate, dodecyl (meth)acrylate, cyclohexyl (meth)acrylate, trifluoroethyl (meth)acrylate or pentafluoroethyl (meth)acrylate. These monomers may be used alone or in combination as a mixture of two or more of them.

The hydrophilic group-containing monomer is a monomer having a hydrophilic group such as a hydroxyl group, a polyalkylene glycol residue, a carboxyl group, an amide group, an N-substituted amide group, an amino group or an N-substituted amino group. Specifically, it may, for example, be a hydroxyl group-containing (meth)acrylate such as hydroxyethyl (meth)acrylate, hydroxypropyl (meth) acrylate, hydroxybutyl (meth)acrylate, dihydroxypropyl (meth)acrylate, dihydroxybutyl (meth)acrylate, diethylene glycol mono(meth)acrylate, triethylene glycol mono(meth) acrylate or dipropylene glycol mono(meth)acrylate; (meth) acrylic acid; (meth)acrylamide; an N-mono-substituted (meth)acrylamide such as N-methyl(meth)acrylamide, N-ethyl(meth)acrylamide or N-hydroxyethyl(meth) acrylamide; an N,N-di-substituted (meth)acrylamide such as N,N-dimethyl(meth)acrylamide, N,N-diethyl(meth) acrylamide or N-ethyl-N-aminoethyl(meth)acrylamide; a (meth)acryloyloxyalkylamine such as (meth) acryloyloxyethylamine; an N-mono-substituted (meth) acryloyloxyalkylamine such as N-methyl(meth) acryloyloxyethylamine; an N,N-di-substituted (meth) acryloyloxyalkylamine such as N,N-dimethyl(meth) acryloyloxyethylamine; or an N-vinyllactam such as N-vinylpyrrolidone. Further, a compound made from a dihydroxyalkyl (meth)acrylate such as 2,3-O-isopropylidene glycerol (meth)acrylate, 2-methyl-2-ethyl-4-(meth) acryloxymethyl-1,3-dioxolane or methyl-2,3-O-isopropylidene glycerol (meth)acrylate, by ketalizing its two hydroxyl groups, may also be mentioned as one having the effects as the above-mentioned hydrophilic group-containing monomers. These monomers may be used alone or in combination as a mixture of two or more of them. Among the above-mentioned monomers, a hydroxyl group-containing (meth)acrylate is preferred.

The monomer having two polymerizable groups in its molecule may, for example, be ethylene glycol di(meth) acrylate, allyl (meth)acrylate, vinyl (meth)acrylate, diethylene glycol di(meth)acrylate, triethylene glycol di(meth) acrylate, propylene glycol di(meth)acrylate, dipropylene glycol di(meth)acrylate. These monomers may be used alone or in combination as a mixture of two or more of them.

Another specific example of the macromonomer suitable for the coating layer material may be a (meth)acrylate type polymer comprising an alkyl (meth)acrylate type monomer and a monomer having two polymerizable groups in its molecule, and having at least one polymerizable group in its molecule on average, as disclosed as component (A) in JP-B-3-57454.

Here, the alkyl (meth)acrylate type monomer may be one wherein the alkyl group in the monomer is of a linear, branched or ring type, and hydrogen atoms in the alkyl group may be substituted by halogen atoms such as fluorine. A specific example may be an alkyl (meth)acrylate such as methyl (meth)acrylate, ethyl (meth)acrylate, propyl (meth) acrylate, butyl (meth)acrylate, pentyl (meth)acrylate, hexyl (meth)acrylate, dodecyl (meth)acrylate, cyclohexyl (meth) acrylate, trifluoroethyl (meth)acrylate or pentafluoropropyl (meth)acrylate. These monomers may be used alone or in combination as a mixture of two or more of them.

Further, the monomer having two polymerizable groups in its molecule may, for example, be allyl (meth)acrylate, vinyl (meth)acrylate, ethylene glycol di(meth)acrylate, diethylene glycol di(meth)acrylate, triethylene glycol di(meth)acrylate or dipropylene glycol di(meth)acrylate. These monomers may be used alone or in combination as a mixture of two or more of them.

Furthermore, the polymer suitable for the coating layer material may, for example, be a polyalkylene glycol (mono) acrylate such as polyethylene glycol mono(meth)acrylate or polypropylene glycol mono(meth)acrylate; polyvinyl alcohol; polyacryl acid; polyethylene oxide; polyethylene oxide bisacetic acid; or a polymer obtained by polymerization of one or two or more of the above-mentioned polymers.

The method of coating the surface of the mold with a solution of such a coating layer material may, for example, be a method of directly immersing the surface of the mold in a solution of the coating layer material, or a method of coating by a brush or the like. However, by either method, it is difficult to coat the entire surface of the mold with the solution uniformly, and a good coating layer can not be obtained. Especially, the mold for an ocular lens has a recess because of the structural requirement, whereby the coating solution tends to pool, and the thickness variation of the coating layer is not avoidable.

Therefore, it is preferred to dissolve the coating material in a low boiling point solvent, and spray it by using a sprayer. Spraying has advantages not only that the surface of the mold can thereby be coated uniformly with the coating material, but also that the coating material will deposit on the surface of the mold while the solvent evaporates simultaneously, which facilitates the stabilization (fixing) of the coating material on the surface of the mold.

However, completely uniform coating is still difficult even by spraying, since it takes longer time to dry the portion where the coating material is more thickly adhered. The variation of the drying time on the mold surface becomes a factor to cause nonuniformity of the coating layer. Because, generally speaking, the coating material is stabilized by being dissolved in a solvent, and during the drying process, it tends to move continuously to the solvent to be dissolved (namely, to the portion not dried yet).

Therefore, in order to make uniform coating possible, and to form a more uniform coating layer, it is preferred to perform spraying of the coating layer material while the mold is rotated, and the rotation is continued also in the drying process. The center axis of the rotation is preferably perpendicular to the center portion of the lens molding surface of the mold.

By rotating the mold, a slight variation of the spraying is absorbed, and the amount of the spraying over the entire mold can be averaged, whereby forming a uniform coating layer becomes possible. Moreover, by continuing the rotation in the drying process, it is possible not only to increase the drying speed, but also to have the drying speed averaged over the mold surface. Accordingly, it becomes possible to form a more uniform coating layer.

Here, the rotational speed of the mold is preferably from 100 to 10,000 (rpm), more preferably from 500 to 5,000 (rpm). If the rotational speed is less than 100 (rpm), averaging of the drying speed by rotation can not be achieved, and if it exceeds 10,000 (rpm), most of the coating solution is scattered away, so that the desired coating can hardly be obtained.

Step 3

The ocular lens material is filled and polymerized in the mold coated with the coating layer material.

In the present invention, the polymerizable component of the ocular lens material is not particularly restricted, and it may be a polymerizable component of the material of any type of ocular lens regardless of water absorptive/non water absorptive or hard/soft type.

It may, for example, be an ocular lens material having a polymerizable component comprising a polysiloxane macromonomer (hereinafter referred to as component A), a silicon-containing alkyl (meth)acrylate (hereinafter referred to as component B) and a hydrophilic monomer (hereinafter referred to as component C) having N-vinylpyrrolidone as the main component, wherein the ratio of the total of components A and B, to component C [total of components A and B/component C (weight ratio)] is from 30/70 to 70/30, the ratio of component A to component B [component A/component B (weight ratio)] is from 25/75 to 75/25, and the ratio of N-vinylpyrrolidone to other hydrophilic monomers in the component C [N-vinylpyrrolidone/component X (weight ratio)] is at least 50/50.

Further, an ocular lens material may be mentioned which contains a siloxane macromonomer having two or more active unsaturated groups and a number average molecular weight of from 2,000 to 100,000, and a lower fatty acid vinyl ester, as polymerizable components.

The polymerization method of the ocular lens material is radical polymerization induced by a heat or a light, and it is required that the lens material contains a polymerization initiator suitable for the polymerization method. The polymerization initiator may be contained in the material used for coating (coating layer material) described in Step 2, and the type of the polymerization initiator may be same as the one contained in the polymerizable component of the lens material, or may be different therefrom.

In a case where the polymerization of the ocular lens material is performed by an photopolymerization, it is preferred to perform the polymerization by irradiation with ultraviolet rays having a wavelength of from 200 to 500 (nm), and having an irradiation intensity of at least 0.1 (mW/cm$^2$), preferably from 0.5 to 20 (mW/cm$^2$). The irradiation time of the ultraviolet rays is not particularly restricted, and it may be a time required for the polymerizable component contained in the ocular lens material to be sufficiently hardened, and for the coating layer material to fix on the lens surface. However, in order for the functions as an optical material not to deteriorate by deformation of the lens or reduction of the transparency after the irradiation of the ultraviolet rays, the irradiation time is preferably at most 24 hours, more preferably at most 60 minutes.

Step 4

The formed polymer is released from the mold to obtain an ocular lens stock material having a coating layer material fixed on its surface.

The releasing is performed by separating male mold 2 from female mold 4. By this forced releasing, usually either male mold 2 or female mold 4 is released from the lens stock material after the polymerization. The mold released at that time may be the male mold or the female mold and is not restricted to be particular one of them.

Then, the lens polymer remaining as fixed on the surface of one of the molds is released by deforming the mold so that the curvature of the molding surface is increased, if possible. Another method of releasing may be a method wherein the lens polymer and the mold are immersed in water and/or an organic solvent. In this method, the lens polymer swells and thereby is released from the mold. In this releasing method by swelling, the stress of the lens polymer by its strain is reduced, and the risk of breakage of the lens is significantly reduced. Therefore, this method is preferably used.

Step 5

Then, an unfixed or unreacted compound is extracted from the ocular lens stock material thus obtained.

By the above-mentioned steps from Step 1 to Step 4, an ocular lens stock material having the coating layer material coated on its surface can be obtained. However, it is preferred to remove an unreacted residual component from the surface layer of the ocular lens stock material by using water and/or an organic solvent.

The organic solvent to be used for the releasing in the above-mentioned Step 4 and/or the removal of unreacted residual component in Step 5 may, for example, be an alcohol such as methanol, ethanol, propanol, butanol or pentanol; acetone; tetrahydrofuran; N,N-dimethylformamide; hexane; benzene; toluene; acetonitrile; or methylene chloride. The removal of unreacted residual component may, for example, be carried out by extraction by means of a Soxhlet extracting method, followed by boiling treatment of the ocular lens stock material in water or physiological saline, as the case requires.

Thus, according to the process for producing an ocular lens of the present invention, it is possible to obtain an ocular lens having a shape faithfully identical to the mold without accompanying deformation of the stock material and having a uniform coating layer. Further, such an ocular lens can be produced by a single mold-polymerization step.

Now, the present invention will be described in further detail with reference to Examples. However, it should be understood that the present invention is by no means restricted to such specific Examples.

EXAMPLE 1

As an example of the present invention, a silicon-containing non water absorptive soft contact lens having a coating layer on its surface and a process for its production will be described.

To a mold for production of a contact lens (constituted by a male mold and a female mold) made of polypropylene, irradiation with the excimer light was carried out by using an irradiator (UER 20-172, tradename, manufactured by Ushio Electric Corporation). The irradiation intensity at the measurement wavelength (172 (nm)) was adjusted to be 13.5 (mW/cm$^2$), and the irradiation was carried out for 5 minutes in the atmosphere at room temperature under atmospheric pressure.

Then, a 3.0 (w/w %) ethanol solution having N-vinylacetamide dissolved in ethanol, was prepared and sprayed on the surface of the mold rotating at 1,000 (rpm), by using a sprayer.

By maintaining the rotation for 2 minutes after the spraying to volatilize the ethanol, a coating layer of N-vinylacetamide was formed on the surface of the mold. It was confirmed by visual observation and observation by a stereo microscope that a uniform coating layer without irregularity was formed.

Then, a mixed solution for ocular lens material comprising following polymerizable components (numeral values represent the composition by parts by weight) was prepared and filled in the female mold of the mold:

| | |
|---|---|
| Urethane-containing polysiloxane macromonomer (chemical formula 1) | 40 parts |
| Tris(trimethylsiloxy)propyl acrylate | 12 parts |
| 2-Hydroxy-3-perfluorohexylpropyl acrylate | 20 parts |
| Vinyl acetate | 28 parts |
| Ethylene glycol dimethacrylate | 0.4 part |

-continued

| | |
|---|---|
| Diethylene glycol diallyl ether | 0.8 part |
| 2-Hydroxy-2-methyl-1-phenylpropan-1-one | 0.2 part |

Chemical formula 1

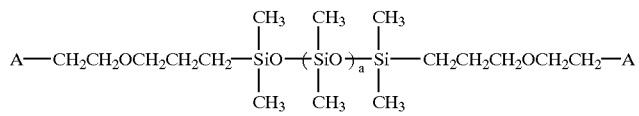

(wherein, A is a group represented by,

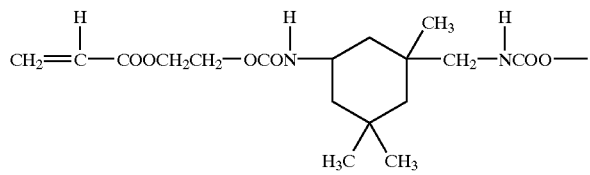

and a is an integer of from 20 to 50)

(In this Example, $a = 38$, number average molecular weight: 6,000, average number of urethane groups: 4.)

After the ocular lens material was filled in the female mold and the male mold was coupled therewith, polymerization was carried out by irradiating ultraviolet rays by means of an ultraviolet ray irradiation system (UX0302-03, tradename, manufactured by Eye Graphics Co., Ltd.). The irradiation intensity was 10.0 (mW/cm$^2$) at the measurement wavelength (365 (nm)), and the irradiation was applied for 10 minutes at room temperature.

After the polymerization, the molds were forcibly separated to release one of the molds from the lens polymer. No damage to the lens polymer was observed at that time. Then, the mold having the lens polymer fixed on its surface, was immersed in a 2-propanol/water (50/50) solution for 2 hours. By this immersion, the lens polymer was sufficiently swelled and thus completely released from the mold.

In order to facilitate the removal of unreacted residual components in the polymerizable component of the lens material and the coating layer material, the lens polymer was put into 2-propanol and immersed for 1 hour. Then, in order to substitute and remove 2-propanol, the lens polymer was put into distilled water and immersed for 2 hours. Further, the lens polymer was put into physiological saline and subjected to autoclave treatment at 121° C. for 20 minutes.

In order to confirm the presence of N-vinylacetamide as the coating layer material on the surface of the lens polymer thus formed (hereinafter referred to as sample ①), a surface analysis was carried out by means of an X-ray photoelectron spectrometer (JPS-9000MX, tradename, manufactured by JEOL Ltd.). The result is shown as sample ① in Table 1.

Further for the purpose of comparison, sample ② was formed. Sample ② was formed by the same process as for sample ①, without the irradiation of the mold with excimer light and the coating with the coating layer material. A surface analysis was carried out also for sample ② by means of an X-ray photoelecron spectrometer (JPS-9000 MX, tradename, manufactured by JEOL, Ltd.). The result is shown as sample ② in Table 1.

TABLE 1

| | F | O | N | C | Si |
|---|---|---|---|---|---|
| Sample ① | 3.7 | 20.8 | 4.1 | 60.8 | 10.6 |
| Sample ② | 10.3 | 23.7 | 2.5 | 48.3 | 14.8 |

From Table 1, it is evident that in the surface of Sample ①, nitrogen atoms (N) are more than in sample ②, and silicon atoms (Si) and fluorine atoms (F) are less.

Nitrogen atoms (N) are contained abundantly in N-vinylacetamide, but the proportion of the nitrogen atoms in the polymerizable component of the lens body is low. Further, silicon atoms (Si) and fluorine atoms (F) are one of the main components of polymerizable components of the lens body, and not contained in N-vinylacetamide.

Therefore, the result of surface analysis in Table 1, suggests that a component of N-vinylacetamide as a coating layer material is present in the surface of the lens polymer.

COMPARATIVE EXAMPLE 1

In order to investigate the relation between the treating condition of the mold surface and the state of the coating layer formed, and the relation between the treating condition of the mold surface and the easiness of releasing the lens stock material after polymerization, several types of molds having different surface treatments applied, were prepared.

The types of molds are, a mold (mold A) having no surface treatment, a mold (mold B) having vacuum plasma treatment applied in an oxygen atmosphere, a mold (mold C) having vacuum plasma treatment applied in a nitrogen atmosphere, a mold (mold D) having vacuum plasma treatment applied in a helium atmosphere, and a mold (mold E: the same as one in Example 1) having excimer light irradiation, applied. By using these five types of molds, lens polymers were produced.

The process was the same as in Example 1 except for the surface treatments of the molds. Further, the plasma treatment conditions were as follows:

Atmosphere gas: O$_2$, N$_2$, He
Gas flow rate: 10 (ml/sec)

Vacuum degree: 60 (Pa)

Output: 10 (Watt)

Treating time: 5 (sec)

At first, the surface condition of the mold after coated with the coating layer material was observed visually and by means of a stereo microscope, and evaluated according to the evaluation standards as shown below. The result is shown in the upper row in Table 2.

(Evaluation Standards)

○: An uniform coating layer is formed over the entire mold.

Δ: The entire mold is coated, but the coating layer thickness is irregular.

X: The coating material is scattered without forming a coating layer.

Further, after the lens material was polymerized, the molds were forcibly separated. In the case of mold A, mold B, mold C and mold D, the interaction between the mold and the coating layer was strong, whereby the lens was often ruptured or was unable to be released. The proportion of the case wherein a lens was recovered while maintaining its shape was evaluated by percentage. The result is shown in the lower row in Table 2.

TABLE 2

|  | Mold A | Mold B | Mold C | Mold D | Mold e |
|---|---|---|---|---|---|
| Surface condition | X | ○ | Δ | Δ | ○ |
| Recovery rate | 100 | 5 | 10 | 0 | 100 |

From the result shown in Table 2, it is evident that in the case where the surface treatment of the mold was carried out by plasma irradiation, a foothold to form a good coating layer was provided, but releasing of the lens material after polymerization became difficult, such being not practical. On the other hand, with the surface treatment of the mold by excimer light irradiation, the forming of a good coating layer was promoted, and the releasing operation was also successful.

REFERENCE EXAMPLE 1

Effects of the surface treatment by excimer light irradiation were confirmed by means of an atomic force microscope (AFM).

To the mold for production of a contact lens, made of polypropylene, excimer light irradiation was carried out by using an irradiator (UER20-172, tradename, manufactured by Ushio Electric Corp). The irradiation intensity was 13.5 (mW/cm$^2$) at the measurement wavelength (172 (nm)), and the irradiation was performed for 5 minutes in the atmosphere at room temperature under atmospheric pressure.

Figure 2A:
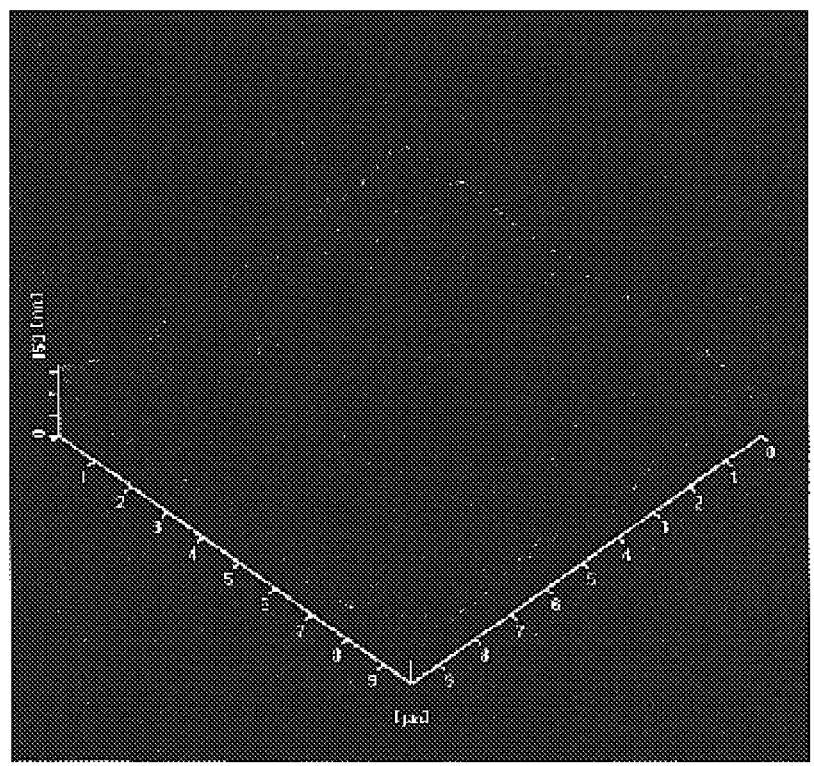
FIG. 2(a) is a view showing the mold surface before applying the excimer light irradiation.
Figure 2B:
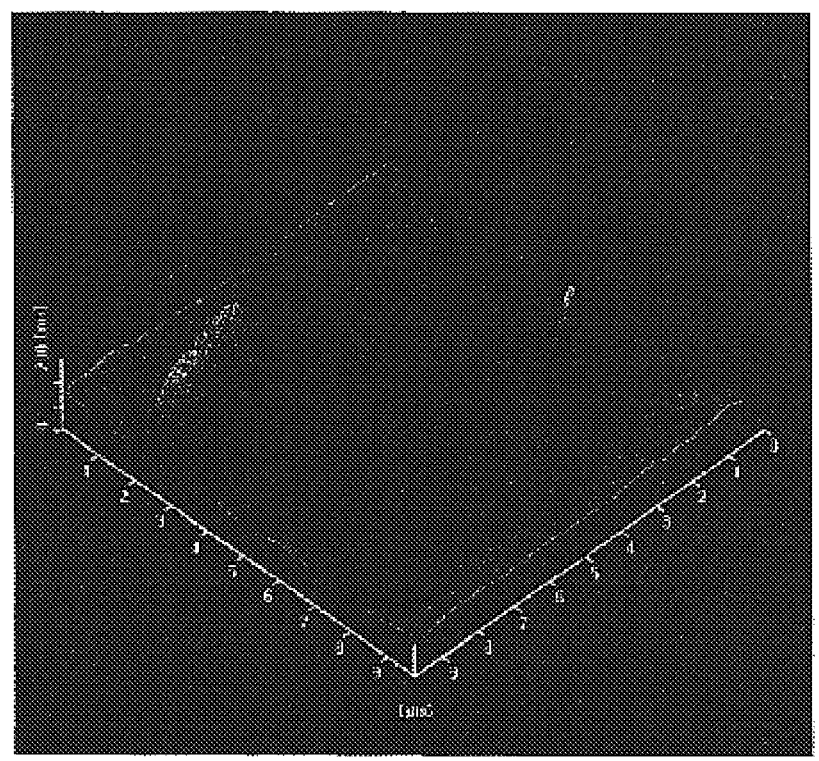
FIG. 2(b) is a view showing the mold surface after applying the excimer light irradiation.

The surface of the mold before and after the irradiation was observed by means of a scanning probe microscope (SPI3800/SPA300, tradename, manufactured by Seiko Instrument Corp.). The result is shown in FIGS. 2(a) and 2(b). FIG. 2(a) shows the mold surface before the excimer light irradiation, and FIG. 2(b) shows the mold surface after irradiated with excimer light for 180 seconds.

From FIGS. 2(a) and 2(b), it is evident that the roughness on the surface of the mold was smoothed by the irradiation of the excimer light.

Further, with respect to the surface of the mold subjected to excimer light irradiation for 0 second (namely no surface treatment), for 60 seconds and for 180 seconds respectively, the "average surface roughness (Ra (nm))", the "maximum top-bottom difference (P–V (nm))" and the "mean square roughness "RMS (NM))" were measured. The result is shown in Table 3.

TABLE 3

|  | 0 second | 60 seconds | 180 seconds |
|---|---|---|---|
| Average surface roughness (Ra: nm) | 9.559 | 8.254 | 6.710 |
| Maximum top-botton difference (P-V: nm) | 105.50 | 61.62 | 54.01 |
| Mean square roughness (RMS: nm) | 13.58 | 10.63 | 8.329 |

The result in Table 3 suggests that the excimer irradiation etched the surface of the mold, and accordingly the roughness of the surface of the mold was smoothed. Further, it is evident that as the irradiation time of the excimer light is longer, the surface of the mold becomes smoother. Therefore, by controlling the intensity and the irradiation time of the excimer light, it is possible to smooth the mold and to provide a desired surface roughness.

COMPARATIVE EXAMPLE 2

In order to investigate the relation between the coating method for a coating layer and the condition of the coating layer thereby formed, and the relation between the coating method for the coating layer and the easiness of releasing the lens stock material after polymerization, lens polymers were prepared by changing the coating method for the coating layer.

In the above-mentioned Example 1, the solution of the coating layer material was sprayed by means of a sprayer. Further, the spraying was carried out, while the mold was rotated.

On the other hand, here, as a Comparative Example, coating with the coating layer material was carried out by three methods i.e. a method (method A) wherein the mold was immersed in the solution of the coating layer material, a method (method B) wherein the solution of the coating layer material was applied and spreaded on the surface of the mold by using a brush, and a method (method C) wherein the solution of the coating layer material was sprayed by using a sprayer. Here, the mold was not rotated. Except for the coating method and the rotation of the mold, the same process as in Example 1 was used to produce a lens polymer.

At first, the mold surface after coating the coating layer material was observed visually and by means of a stereo microscope, and evaluated based on the following evaluation standards. The result is shown in the upper row in Table 4.

(Evaluation Standards)

○: A uniform coating layer is formed over the entire mold.

Δ: The entire mold is coated, but the coating layer thickness is irregular.

X: The entire mold is coated, but the coating layer thickness is irregular and the solution is pooled in a recess.

Further, after the lens polymerization, the molds were forcibly separated, and the proportion of the case wherein a lens was recovered while maintaining its shape, was evaluated by percentage. The result is shown in the lower row in Table 4.

TABLE 4

|  | Method A | Method B | Method C |
|---|---|---|---|
| Surface condition | X | X | Δ |
| Recovery rate | 100 | 100 | 100 |

From this result, it is evident that by the method of immersing the mold in the solution of the coating layer material (method A), and the method of applying and spreading the material with a brush (method B), a pool of the solution was formed in a recess in the mold, whereby a good coating layer can not be formed. Further, even by the method of spraying the material by using a sprayer (method C), the thickness of the coating layer varies locally, and the product is not useful as an ocular lens material. These coating methods did not adversely affect the releasing operation.

COMPARATIVE EXAMPLE 3

In the above-mentioned Example 1, a coating layer was formed by spraying the coating layer material while the mold was rotated.

Therefore, a comparative investigation was performed between the rotation of the mold and the condition of the coating layer formed, and between the rotation of the mold and the easiness of releasing the lens material after polymerization.

The coating layer was formed under three conditions i.e., a condition (condition A) such that the mold was not rotated during the spraying of coating layer material, a condition (condition B) such that the mold was rotated at 100 rpm, and a condition (condition C) such that the mold was rotated at 1,000 rpm, and a lens polymer was produced under the same condition as in Example 1 with respect to other steps.

At first, the surface condition of the mold after coated with the coating layer material by spraying, was observed visually and by means of a stereo microscope, and evaluated based on the evaluation standards shown below. The result is shown in the upper row in Table 5.
(Evaluation Standards)
  ○: A uniform coating layer is formed over the entire the entire mold.
  Δ: The entire mold is coated, but the coating layer has slight irregularities in its thickness.
  X: The entire mold is coated, but the coating layer has irregularities in its thickness.

Further, after the lens material was polymerized and the molds were forcibly separated, the proportion the case wherein a lens was recovered while maintaining its shape, was evaluated by percentage. The result is shown in the lower row in Table 5.

TABLE 5

|  | Condition A | Condition B | Condition C |
|---|---|---|---|
| Surface condition | X | Δ | ○ |
| Recovery rate | 100 | 100 | 100 |

The result shown in Table 5 indicates that by spraying the coating layer material while rotating the mold at about 1,000 rpm, a uniform coating layer can be formed.

EXAMPLE 2

As another Example of the present invention, a silicon-containing non-water absorptive soft contact lens having a coating layer on its surface, and a process for its production will be described.

At first, irradiation of excimer light was carried out on a mold made of polypropylene to produce a soft contact lens, under the same condition as in Example 1.

Then, a 3.0 (w/w %) ethanol solution having a macromonomer (CA registration No. 169873-86-3) (chemical formula 2) comprising methyl methacrylate, 2-hydroxybutyl methacrylate, allyl methacrylate and ethylene glycol dimethacrylate, dissolved in ethanol, was prepared and sprayed on the surface of a mold rotating at 1,000 (rpm) by means of a sprayer.

Chemical formula 2

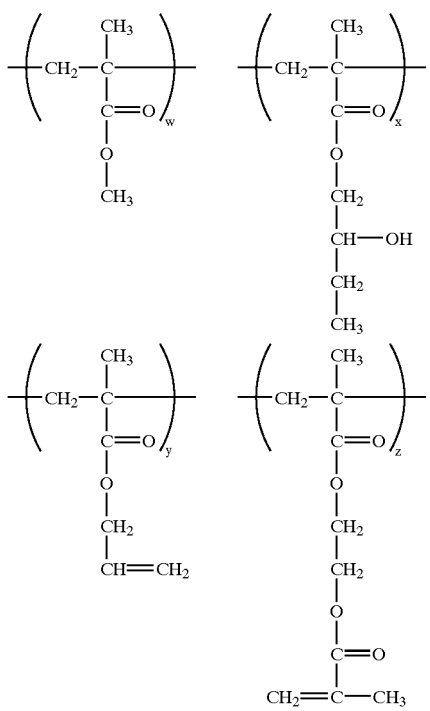

The rotation was maintained for 2 minutes after the spraying to let ethanol volatilize, and the coating layer of the above-mentioned macromonomer was formed on the surface of the mold. It was confirmed by visual observation and observation by means of a stereo microscope that a uniform coating layer without irregularity was formed.

Further, under the same condition as in Example 1, filling and polymerization of the lens material, releasing it from the mold, treatment with a solvent and autoclave treatment were carried out to obtain a lens polymer.

With the lens polymer thus obtained, surface stickiness was apparently reduced as compared with an uncoated lens polymer having no coating layer.

EXAMPLE 3

As another Example of the present invention, a silicon-containing water absorptive soft contact lens having a coating layer on its surface and a process for its production will be described.

At first, to a mold for producing a contact lens (constituted by a male mold and a female mold), made of polypropylene, irradiation of excimer light was applied by means of an irradiator (UER20-172, tradename, manufactured by Ushio Electric Corp.). The irradiation intensity was 13.5 (mW/cm$^2$) at the measurement wavelength (172 (nm)), and the irradiation was carried out for 5 minutes in the atmosphere at room temperature under atmospheric pressure.

Then, a 3.0 (w/w %) butanol solution having polyvinyl alcohol (average molecular weight:1,700, saponification:88%) dissolved in 1-butanol, was prepared, and sprayed on the surface of the mold rotating at 1,000 (rpm) by means of a sprayer.

The rotation was maintained for 10 minutes after the spraying to let butanol volatilize, and thus a coating layer of polyvinyl alcohol was formed on the surface of the mold. It was confirmed by visual observation and observation by means of a stereo microscope that an uniform coating layer without irregularity was formed.

A mixed solution of an ocular lens material comprising the following polymerizable components (the numerical values represent the composition by parts by weight) was prepared and filled in the female mold of the above-mentioned mold:

| | |
|---|---|
| Urethane-containing polysiloxane macromonomer (chemical formula 1) | 40 parts |
| 2-Hydroxyethyl methacrylate | 30 parts |
| 1-Butanol | 30 parts |
| Ethylene glycol dimethacrylate | 1.0 part |
| 2-Hydroxy-2-methyl-1-phenylpropan-1-one | 0.2 part |

A male mold was coupled with the female mold, and then polymerization was carried out by irradiating ultraviolet rays by an ultraviolet irradiation system (UX0302-03, manufactured by Eye Graphics Co., Ltd.). The irradiation intensity was 10.0 (mW/cm$^2$) at the measurement wavelength (365 (nm)), and the irradiation was carried out at room temperature for 10 minutes.

After the polymerization, the molds were forcibly to separated, to release one of the molds from the lens polymer. No damage to the lens polymer was observed at that time. Then, the mold having the lens polymer fixed to its surface, was immersed in the solution of a 2-propanol/water (50/50) solution for 2 hours. By this immersion, the lens polymer was sufficiently swelled and released completely from the mold.

In order to facilitate the removal of unreacted residual components from the lens polymerizable components and the coating layer material, the lens polymer was put into 2-propanol and immersed for 1 hour. Then, in order to substitute and remove 2-propanol, the lens polymer was put into distilled water and immersed for 2 hours. Further, this lens polymer was put into physiological saline and subjected to autoclave treatment at 121° C. for 20 minutes.

The cross section of the ocular lens thus produced was analyzed by means of an Energy Dispersive X-ray Analyzer (JED-2140, tradename, manufactured by JEOL Ltd.), whereby no Si component was detected on the surface. This result indicates that a coating layer of polyvinyl alcohol was formed successfully on the surface of the ocular lens thus obtained.

According to the present invention, it is possible to form a uniform and homogenous coating layer on the surface of an ocular lens. Further, the uniform and homogenous coating layer can be obtained regardless of the material of the lens mold and the coating layer material, and no special lens material is required.

Further, both the lens body and the coating layer can be formed by a single polymerization reaction, whereby the number of process steps can be minimized, and an ocular lens having a coating layer can be produced easily and with low cost. Further, the ocular lens released from the mold is not subjected to any treatment, whereby no deformation will be induced to the lens after molding, and thus, an ocular lens having a desired optical shape can surely be obtained.

The entire disclosure of Japanese Patent Application No. 2001-191303 filed on Jun. 25, 2001 including specification, claims, drawings and summary are incorporated herein by reference in its entirety.

What is claimed is:

1. A process for producing an ocular lens by using a mold, which comprises:

a step of irradiating with an excimer light at least a part of a molding surface of the mold for shaping an ocular lens surface, a step of uniformly coating the mold surface irradiated with the excimer light, with a compound fixable to the ocular lens surface by an interaction with a polymerizable component in an ocular lens material, or a solution of such a compound, a step of filling the ocular lens material into the mold and polymerizing it, a step of releasing a polymer obtained by the polymerization from the mold, to obtain an ocular lens stock material having the coated compound fixed on the surface, and a step of extracting an unfixed or unreacted compound from the obtained ocular lens material.

2. The process according to claim 1 wherein after the coating with the compound or the solution of the compound, the compound or the solution of the compound is dried, and after the drying, the ocular lens material is filled in the mold.

3. The process according to claim 1, wherein the coating with the compound fixable to the ocular lens surface, or the solution of the compound, is performed, while the mold is rotated on a rotation axis perpendicular to a center portion of the molding surface for shaping the surface of the ocular lens.

4. The process according to claim 1, wherein the compound fixable to the ocular lens surface is a liquefied monomer, a macromonomer, a polymer, or a mixture thereof.

5. The process according to claim 1, wherein the solution of the compound fixable to the ocular lens surface is a solution having a monomer being solid and/or a monomer being highly viscous liquid at room temperature dissolved in a solvent.

6. The process according to claim 1, wherein the solution of the compound fixable to the ocular lens surface is either a solution having a monomer or a macromonomer dissolved in a solvent, or a solution having a mixture of a monomer and a macromonomer dissolved in a solvent.

7. The process according to claim 1, wherein the solution of the compound fixable to the ocular lens surface is a solution having a polymer dissolved in a solvent.

8. The process according to claim 4, wherein the compound fixable to the ocular lens surface is a hydrophilic monomer, a macromonomer containing a hydrophilic monomer as the main component, a polymer containing a hydrophilic monomer as the main component, or a mixture thereof.

9. An ocular lens produced by the process as defined in claim 1.

10. The process according to claim 1, wherein the excimer light uses an emission gas selected from the group consisting of argon, krypton, xenon, krypton chloride and xenon chloride.

11. The process according to claim 10, wherein the excimer light uses a vacuum ultraviolet light having an emission center wavelength of 172 nm by using xenon as the emission gas.

12. The process according to claim 1, wherein the excimer light is applied for a irradiation time of from 1 second to 60 minutes.

13. The process according to claim 12, wherein the irradiation time is from 1 second to 10 minutes.

\* \* \* \* \*